US006935642B1

(12) United States Patent
Craig et al.

(10) Patent No.: US 6,935,642 B1
(45) Date of Patent: Aug. 30, 2005

(54) CART FRAME GENERATOR

(75) Inventors: Scott Craig, Jackson, TN (US); P. Brent Boyd, Jackson, TN (US)

(73) Assignee: DeVilbiss Air Power Company, Jackson, TN (US)

(*) Notice: Subject to any disclaimer, the term of this patent is extended or adjusted under 35 U.S.C. 154(b) by 119 days.

(21) Appl. No.: 10/438,193

(22) Filed: May 14, 2003

Related U.S. Application Data

(60) Provisional application No. 60/380,338, filed on May 14, 2002.

(51) Int. Cl.[7] .................................................. B62B 1/00
(52) U.S. Cl. ............................. 280/47.24; 280/47.315
(58) Field of Search ........................... 280/79.4, 79.5, 280/47.24, 47.32, 652, 655.1, 47.315; D34/24; D13/112, 116

(56) References Cited

U.S. PATENT DOCUMENTS

| | | | | |
|---|---|---|---|---|
| D182,298 S | * | 3/1958 | McGrath | D34/24 |
| D223,039 S | * | 2/1972 | Widmer | D15/7 |
| D278,425 S | * | 4/1985 | Toshihiko | D13/116 |
| 4,523,774 A | * | 6/1985 | Dickerson | 280/655 |
| 4,790,559 A | * | 12/1988 | Edmonds | 280/655 |
| D418,809 S | * | 1/2000 | Frank | D13/112 |
| D444,279 S | * | 6/2001 | Kristiansen et al. | D34/12 |
| D450,061 S | * | 11/2001 | Graber et al. | D15/9 |
| D459,851 S | * | 7/2002 | Rehkugler et al. | D34/24 |
| D489,327 S | * | 5/2004 | Imai | D13/116 |
| D494,929 S | * | 8/2004 | Imai | D13/116 |

* cited by examiner

Primary Examiner—Bryan Fischmann
(74) Attorney, Agent, or Firm—Suiter West Swantz pc llo (57) ABSTRACT

The present invention is directed to a generator including a cart-type fame assembly for transporting the generator. The generator of the present invention is mounted to a multi-segmented base frame assembly which forms a partial cage about the generator for protecting the generator while minimizing the overall weight of the apparatus. In additional embodiments, a generator bracket, for supporting an alternator, is implemented to provide a convenient and economical mounting for a pair of wheels.

23 Claims, 8 Drawing Sheets

CART FRAME GENERATOR

CROSS REFERENCE

The present application claims priority under 35 U.S.C. §119(e) to U.S. Provisional Patent Ser. No. 60/380,338, entitled: Cart Style Generator, filed on May 14, 2002, which is hereby incorporated in its entirety.

FIELD OF THE INVENTION

The present invention relates to the field of portable mechanical devices and particularly to an apparatus for transporting a portable internal combustion device.

BACKGROUND OF THE INVENTION

Portable devices, provide users with a wide variety of time saving capabilities. One drawback to portable mechanical devices, such as power washers, compressors and generators, has been transporting the device to the worksite. For instance, generators, and especially contractor grade generators, often are transported over long distances to the worksite. Worksites often include rough or muddy terrain which may hinder transport.

Another difficulty experienced with portable devices and particularly contractor grade devices is that users may abuse the device. For instance, portable mechanical devices may be treated roughly, or with little care as potential damage, such as from being transported in pick-up truck bed or from being transported to and from a vehicle to the ultimate worksite. While it is desirable to protect the device as much as possible, additions to the frame surrounding the device may unnecessarily add weight thus making transport and lifting more difficult.

Therefore, it would be desirable to provide an apparatus for easy pull-type rolling transport and protection of the mechanical device from damage.

SUMMARY OF THE INVENTION

Accordingly, the present invention is directed to an apparatus including mechanical device and a cart-type frame assembly. In an exemplary embodiments, the cart forms a partial cage for protecting the mechanical device.

In another aspect of the invention, the apparatus includes a generator with an internal combustion and an alternator. The alternator being directed generally towards the spaced apart wheel members and the connection between the first and second segment included in a base frame, so as to minimize the force required to tilt the apparatus for rolling transport.

In an additional aspect of the invention, a generator bracket for supporting the alternator is utilized for mounting a pair of spaced apart wheels for transporting the apparatus. The generator bracket may form a tabbed end so as to attach the wheel via a shoulder bolt.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that while some figures contained herein are not formally related, such as showing various views of a single embodiment, generally corresponding structures have been assigned corresponding reference numbers.

Figure 1:
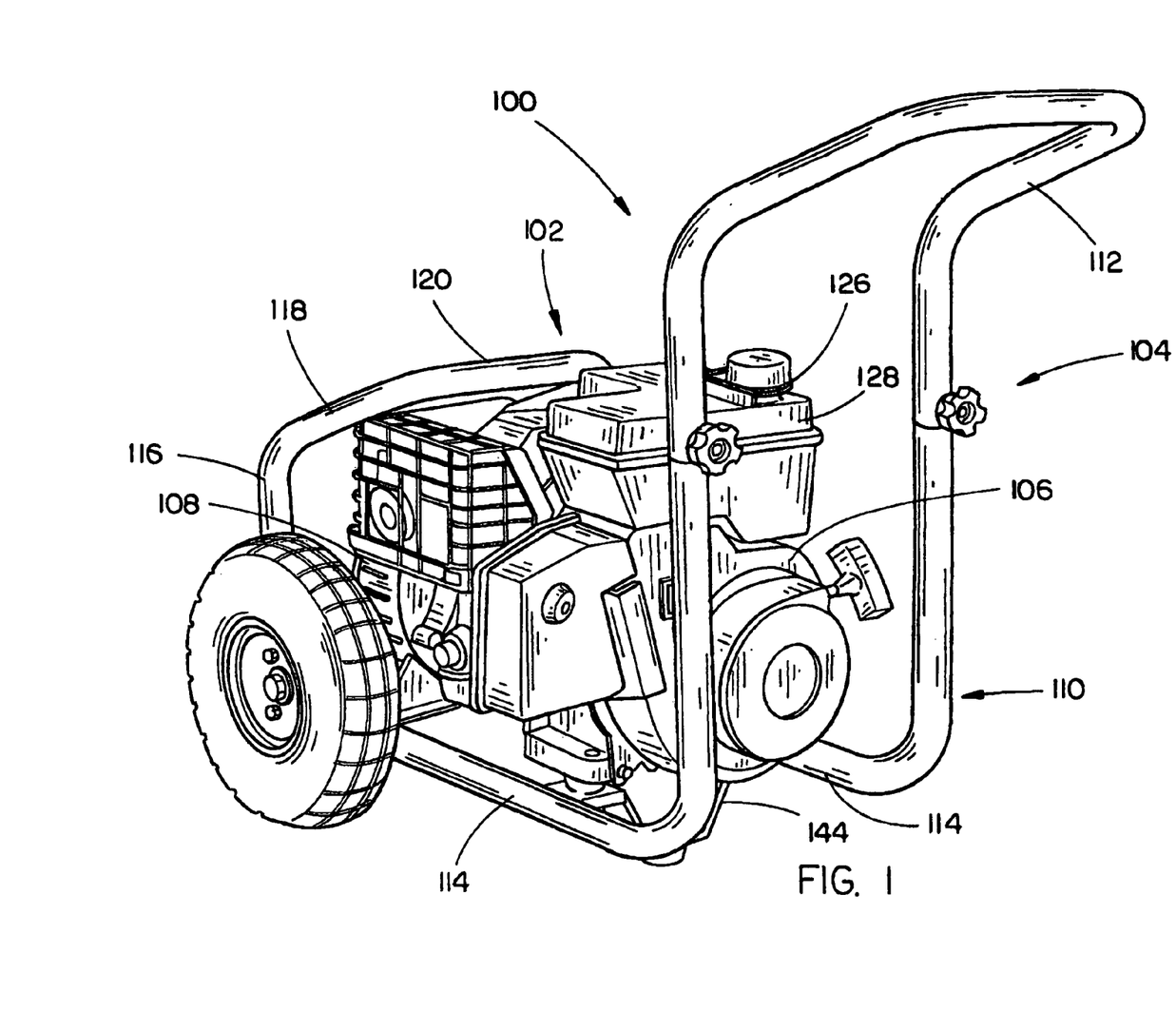
FIG. 1 is a perspective view of a generator integrated with cart-type frame assembly of the present invention.

Referring to FIG. 1, a portable apparatus 100 is described. In accordance with an exemplary embodiment, a portable apparatus 100 includes is a generator 102 and cart-type frame assembly 104. The generator 102 includes an internal combustion engine 106 for creating mechanical energy and an alternator 108, coupled to the engine, for converting mechanical energy into electrical energy. In further embodiments, the cart frame assembly 104 may be implemented with various mechanical devices including compressors, power washers, pumps and the like for conducting a task, such as delivering a high pressure stream of water, delivering a stream of compressed air and the like. As will be apparent, various devices may benefit from employing the cart of the present invention without departing from the spirit and scope of the present invention. For example, users may wish to pull the apparatus rather than push the device. It is the intention of the present disclosure to encompass and include such variation.

The cart-type frame assembly 104 includes a base frame member 110 and a handle frame member 112. Preferably, the base and handle frame members 110 and 112, respectively are formed of metallic cylindrical tubing, such as steel tubing. In further instances, the shape and the composition of the frame sections may be varied as desired. For instance, the second frame portion may be formed from oval shaped tubing, for user comfort while manually transporting the apparatus.

The base frame member 110 is generally U-shaped and multi-segmented with the connecting portion 120 being formed as a straight side. The base frame member is multi-segmented to substantially encompass the mechanical device. For example, the base and handle frame may protect the mechanical device from contacting the side of a pick-up truck compartment, or from contacting other objects in the compartment. In the present embodiment, the various segments forming the base frame are unitary. In additional embodiments, the segments are formed individually and connected as desired. For example, the base frame may be formed of two pieces connected at the intersection of two segments so as to reduce the overall size of the initial workpiece. The generally parallel portions of the frame may be spaced approximately 18" (inches) apart to allow for convenient marketing, storage, transport through narrow openings and the like.

Figure 2:
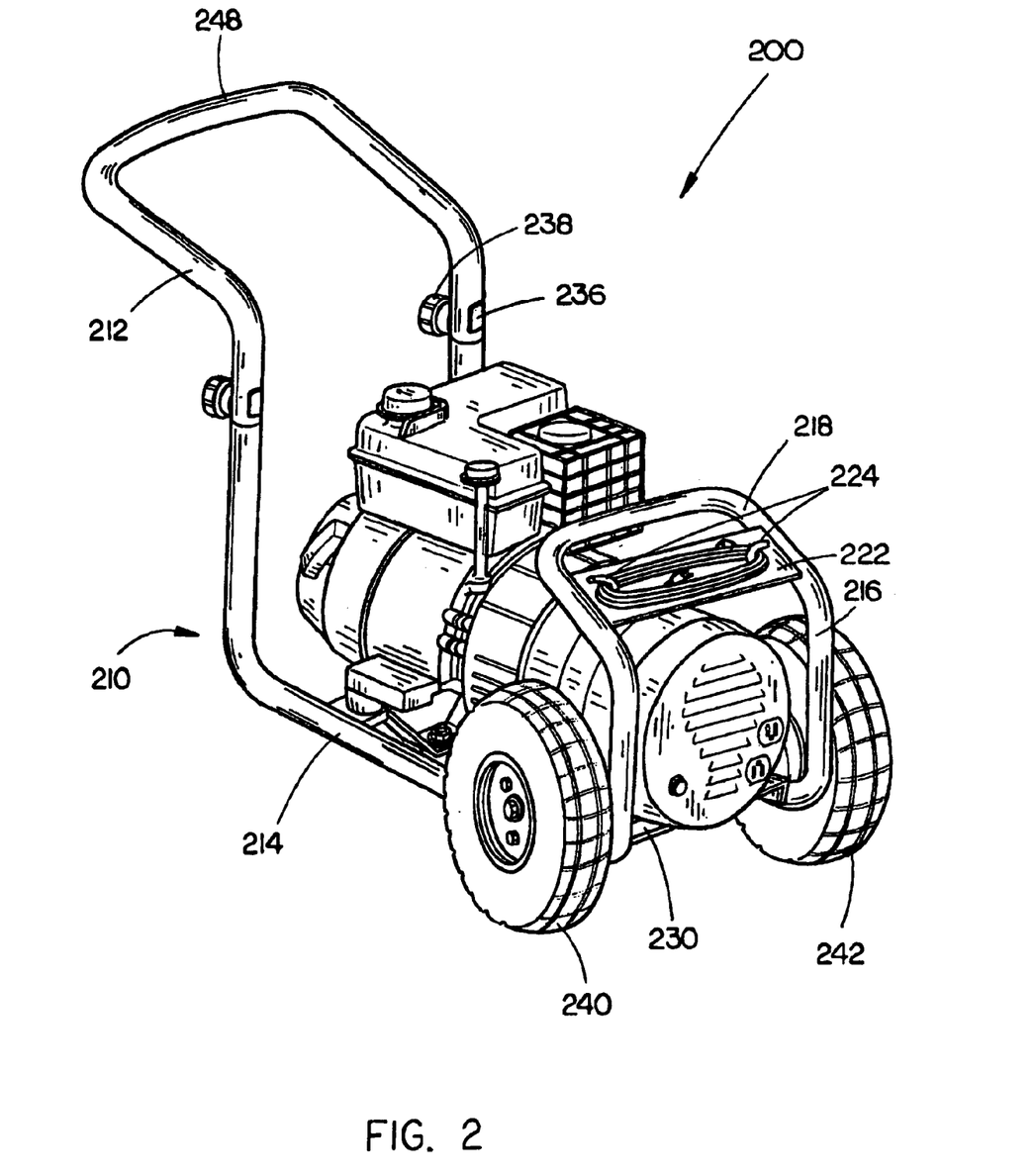
FIG. 2 is a perspective view of a generator integrated with cart-type frame assembly of the present invention.
Figure 3:
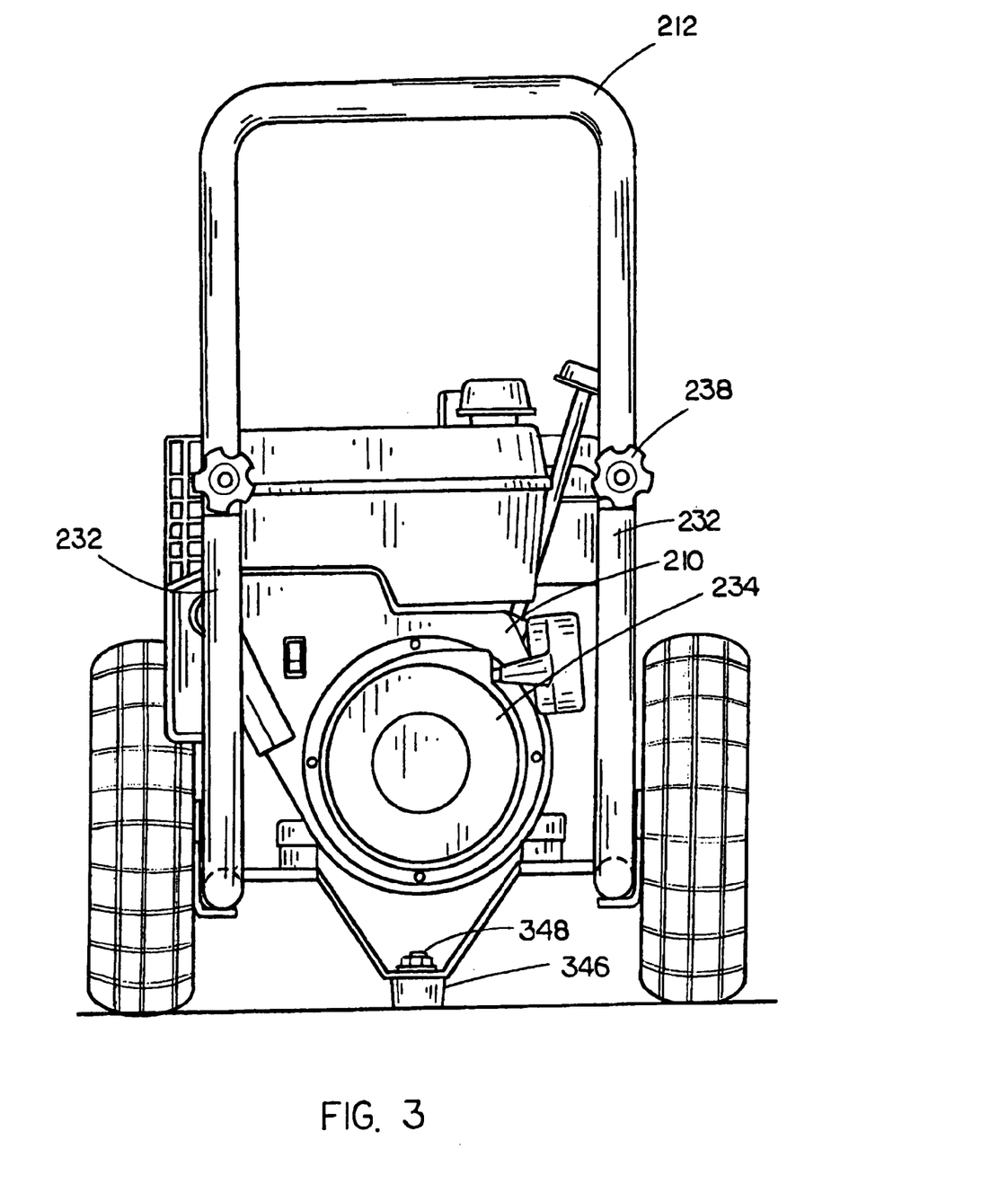
FIG. 3 is an end view of the apparatus of FIG. 2.

In an exemplary embodiment, the base frame member 110 includes a first segment 114 for mounting the mechanical device either directly, via a generator bracket 230, as may be best seen in FIGS. 2 and 3, 230 or the like. Preferably, the first segment 114 is of a length substantially equal to, or greater than the length of the mechanical device to be received. A second segment 116 extends generally perpendicular from an end of the first segment 114. For example, the second segment 116 extends toward the alternator 108 to protect the alternator from damage. For example, the second segment 116 is substantially equal to the height of the adjacent portion of the mechanical device, such as the alternator 108. In another example, the second segment is equal to the height of a tank included in a compressor.

A third segment 118 extends from the second segment 116, opposite the first segment 114. The third segment 118 angles obliquely, towards the mechanical device from the second segment 116. For example, the third segment extends in the range of greater than 90° (degrees) but less than 180° (degrees) from the second segment 116 towards the generator engine 106. Preferably, the third segment terminates generally equal to or greater than the mechanical device. For example, the third segment extends substantially equal to the filling port 126 included in a fuel reservoir 128 for the generator engine 106. In further embodiments, a fuel reservoir includes a lip adjacent the fill port for additionally protecting the fuel port. Thus, protecting the fuel reservoir 128 from damage, such as if the apparatus is over-turned or the like. In the present instance, the fuel reservoir may be mounted to the top of the engine to allow convenient filling. The present configuration allows for the base frame member 110 to sufficiently encompass the generator 102 to protect the generator without adding the additional weight of a continuous cage around the generator. Moreover, the connecting element 120 adjacent the third segment 118 may act as a lifting point when grasping the base frame 110.

Referring now to FIGS. 2 and 3, a fourth segment 232 is included in the base frame 210. The fourth segment 232 extends substantially perpendicular to the first segment 214 and distil from the intersection of the first and second segment 214, 216. The fourth segment 232 of the base frame 210 protects the engine 206 from accidental damage. For instance, the fourth segment 232 is disposed beyond a shroud for the pull-cord type starter, which may be easily damaged. In another example, the fourth segment extends substantially equal to or greater than the height of the mechanical device for protecting the device as well as providing a suitable connection for a handle frame member.

Referring to FIG. 2, in additional exemplary embodiments, a generally rectangular face plate 222 is connected between the tubing forming the third segment 218. The face plate 222 may act to increase the rigidity of the fame as well as providing a mounting surface for accessories. The face plate 222 may include a set of spaced apart hooks 224 for looping an extension cord, a pneumatic hose, or the like. In further embodiments, snap posts, clips, hooks, clamps, hangers, loop straps, recessed holders and the like may be included in the face plate or mounted to the plate to secure accessories such as pressure washer nozzles, spray wands, pneumatic nozzles and the like. A user may securely carry the accessory while rolling the apparatus 800. See generally FIG. 8.

Referring to FIG. 2, a handle frame member 212 is removably connected to the base frame member 210. In the present embodiment, the handle frame member is substantially U-shaped and angles obliquely away from the mechanical device, in the range of greater than 90° (degrees) but less than 180° (degrees) from the fourth frame segment 232 to promote easy pull-type rolling transport of the apparatus over terrain, increase rolling transport clearance and the like. Additionally, the connecting portion 248 of the second frame member 212 may be coated with an elastomeric material or enclosed in a sleeve of elastomeric material to improve grasping, minimize muscle fatigue, dampen vibration and the like.

Figure 6:
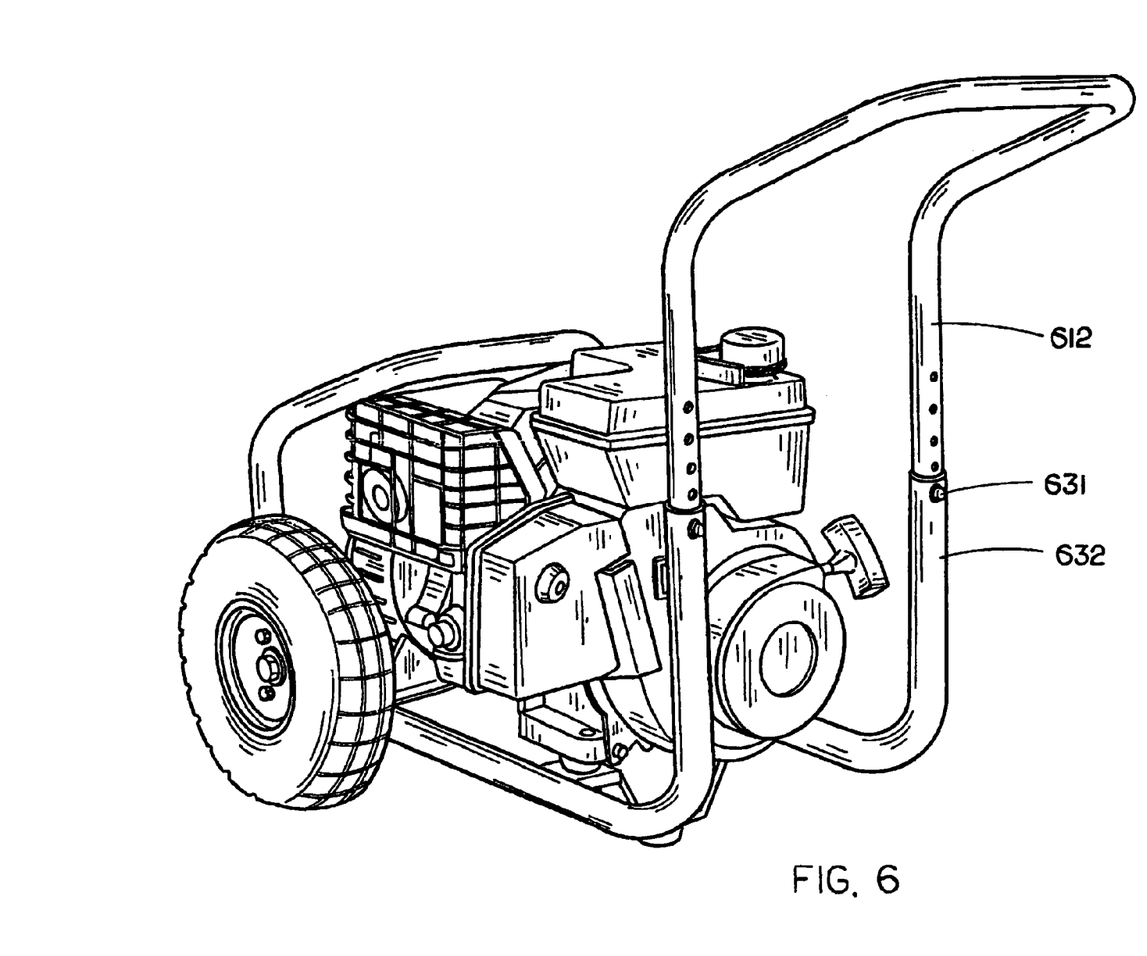
FIG. 6 is a perspective view of a generator integrated with cart-type frame assembly including a telescoping handle frame member.
Figure 7:
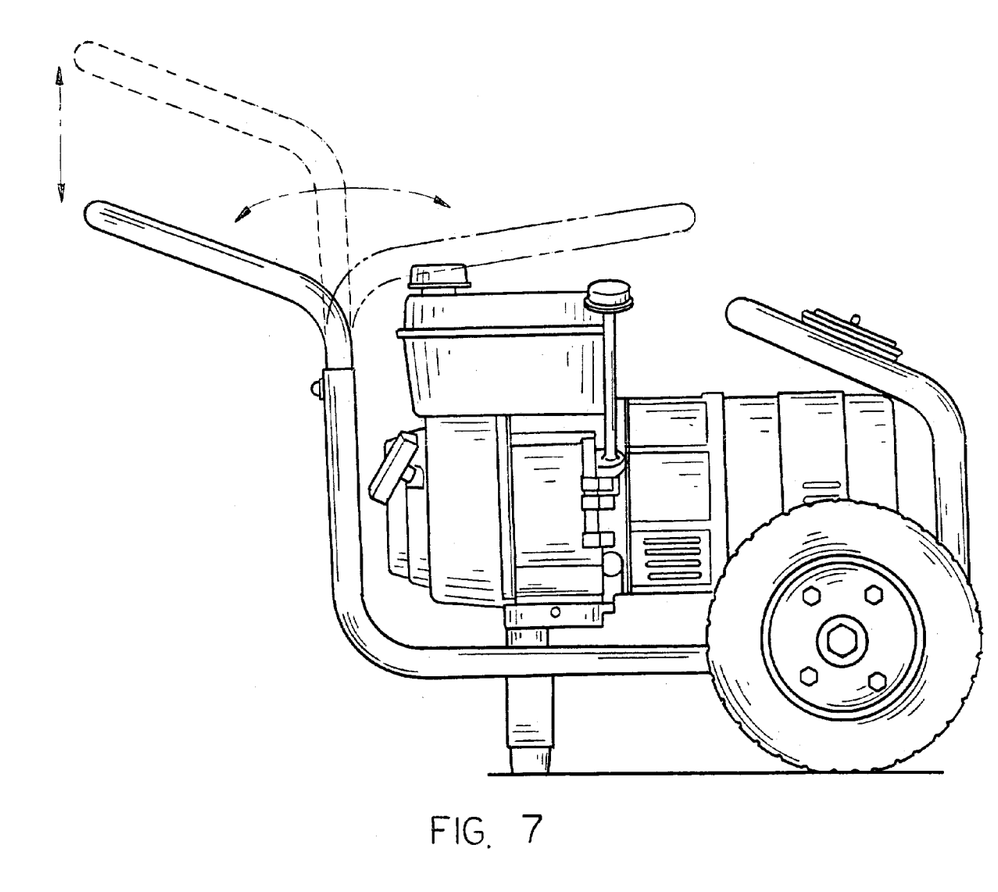
FIG. 7 is a side view of a generator integrated with a cart-type frame assembly of the present invention wherein the handle frame member may be telescoped and inverted.

A securing device connects a terminating segment of the base frame member to a corresponding terminating segment of the handle frame member. Referring to FIGS. 2 and 3, in the current example, the securing device is a through bolt 236 and a threaded hand grip knob 238. Other suitable securing devices include fasteners, bolts and butterfly nuts, a linchpin, a hair pin and through pin combination, bayonet locks, set bolts, spring biased pins, clamp locks, and the like for permitting releasable securing of the frame members. In a first embodiment, at least one of the terminal segment of the fourth segment 232 and the handle frame member 212 is slideably received into a corresponding portion of the other frame with a bolt, extending through aligned apertures in the members, and nut securing the bolt. In another example, as may be seen generally in FIG. 6 a plurality of apertures in the terminal segments of at least one frame portion to allow the user to semi-customize, or telescope the height of the handle frame member 612 so as to engage a spring biased pin 631 for extending through apertures in the handle frame member and the fourth segment 632. Preferably, the connection between the base frame and the handle frame members permits the weight of the device to be borne by the connection so as to minimize stress on the securing device. The handle frame member may be implemented to protect the mechanical device when in a retracted or stowed position. See generally FIGS. 6 and 7.

Figure 4:
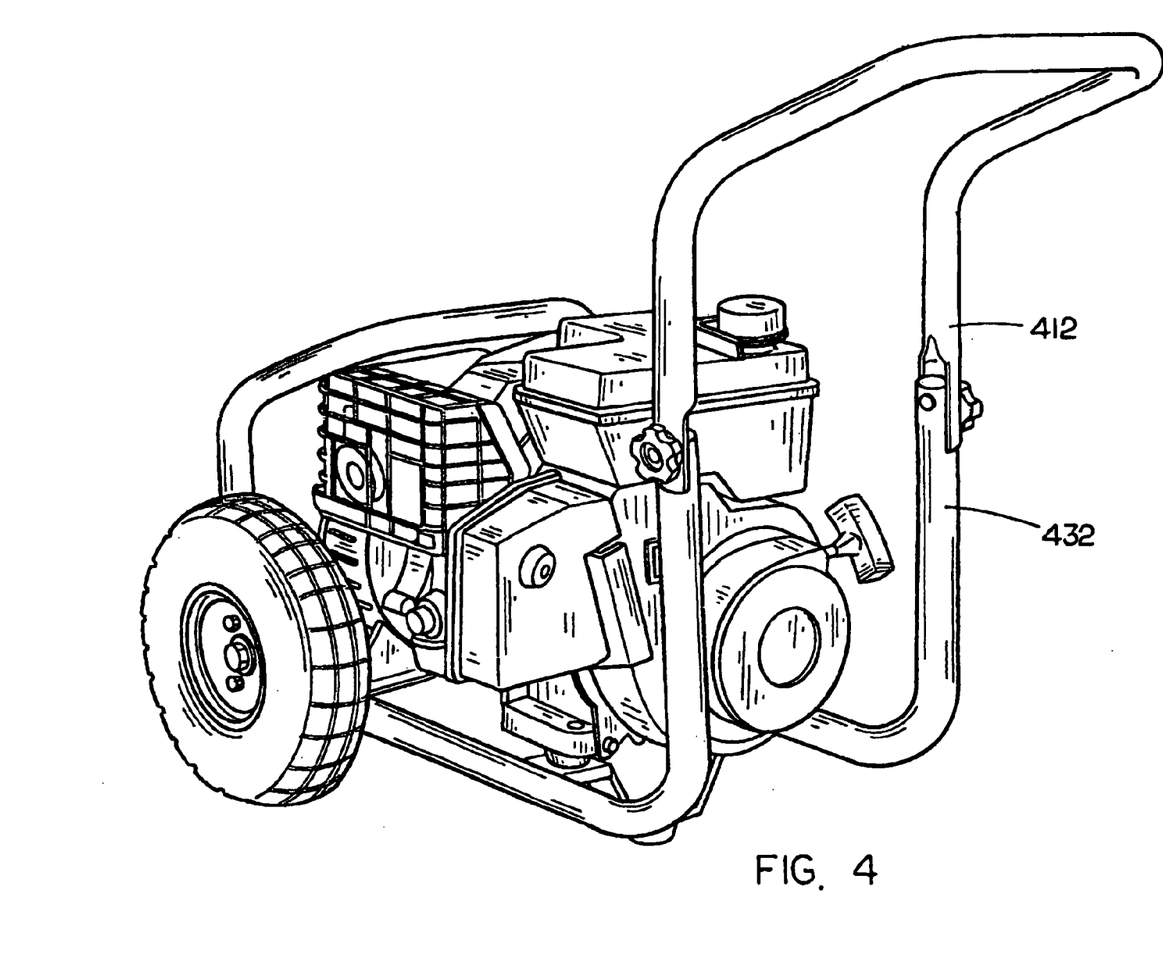
FIG. 4 is a perspective view of a generator integrated with a cart-type frame assembly wherein the handle frame member portion includes a C-shaped cross-sectional area.
Figure 5:
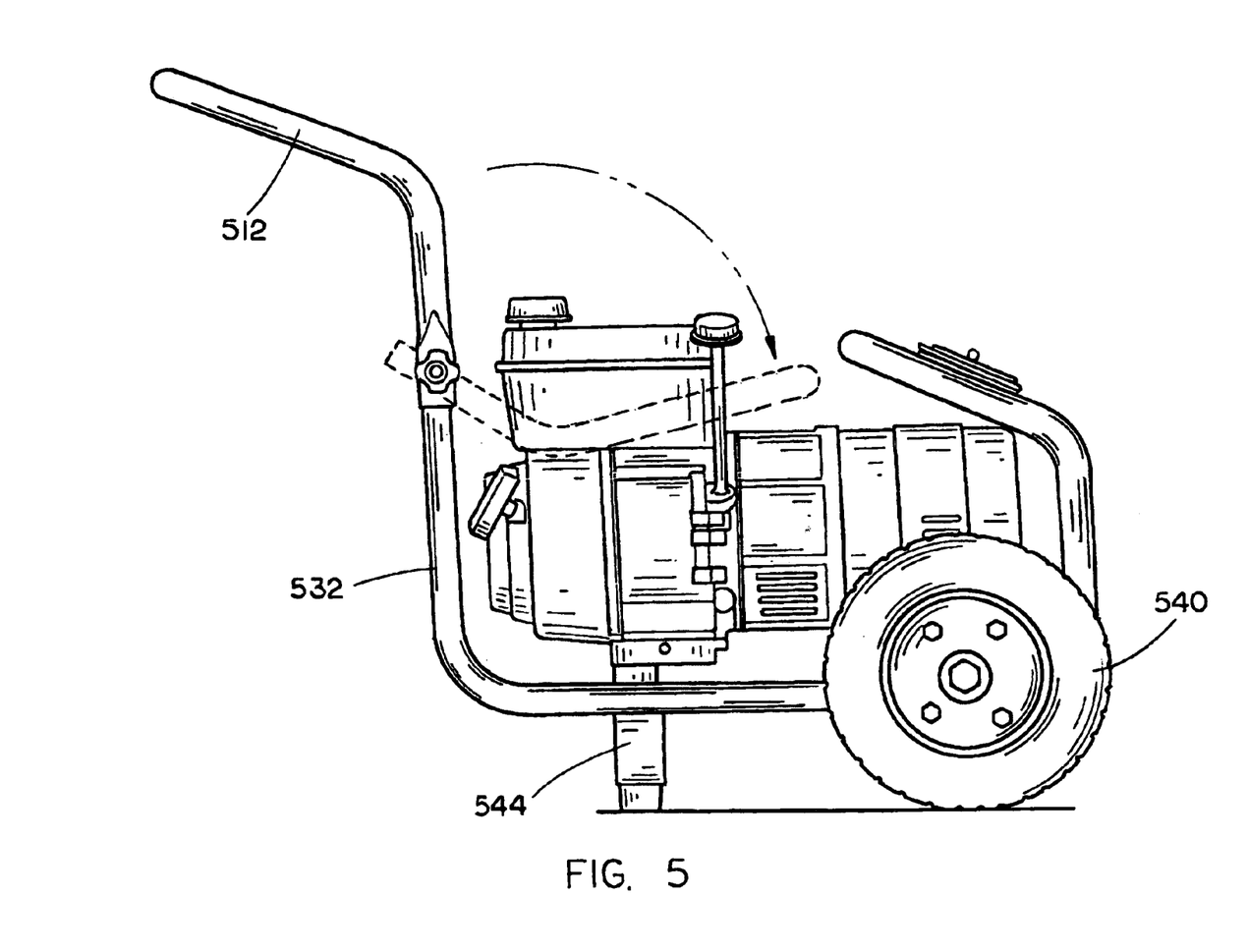
FIG. 5 is a side view of a generator integrated with a cart-type frame assembly wherein the handle frame member may be disposed in a folded position.

Referring now to FIGS. 4 and 5, in a further aspect, at least one of the terminal portions of the fourth segment and handle frame member include substantially C-shaped cross-section, so as to permit close contact between the corresponding ends when secured. For example, the ends of the handle frame member 412 are C-shaped to secure partially around the outside surface of the corresponding circular-cross section of the fourth segment ends 432. In additional examples, the C-shaped end includes a coved recess extending generally perpendicular to the C-shaped cross section, adjacent the securing device, to increase the contact between the ends when the handle frame member is "folded over" such as when being transported in a vehicle or the like. See generally FIG. 5.

Referring to FIGS. 1 and 2, an apparatus 100, 200 of the present invention further includes a pair of spaced-apart wheels 240 and 242 mounted to the first segment 214 of the base frame member 210 adjacent the second segment 216. As will be apparent, the wheels may be additionally or solely attached to a bracket supporting the mechanical device, adjacent the first base frame segment. Referring now to FIG. 3, for instance, the wheels are mounted via a shoulder bolt to a tabbed portion of a generator bracket 230. In a further embodiment, the wheels 240 and 242 are spaced approximately 18" (inches) apart to allow for maneuverability and the like. Additionally, spacing the wheels approximately 18" (inches) apart may allow for convenient display during retailing, efficient transport, and minimizing tipping when turning.

As may be best seen in FIG. 5, the wheels (one is shown 540) may be of a radius approximately equal to the height of a foot member 544. Including wheels with a radius of the foot member allows an included mechanical device to be substantially level, when disposed on a level surface. Inclusion of a foot member 544, such as is connected or mounted proximate the fourth segment 532 permits tripod type support when the apparatus is rested, thus minimizing tipping. Referring to FIG. 2, the tripod being formed between the foot member 244 and the wheels 240 and 242.

For ease of manufacture, and rigidity, the foot member 544 may be an angular bracket connected to the first segment of the base frame member, such as by a fastener, such as a bolt, a weld or the like. In further examples the foot member includes tabbed portions for securing to the base frame. A level mechanical device may experience significantly less mechanical wear, over a non-level device, because of proper balancing, thorough lubrication and the like.

Figure 8:
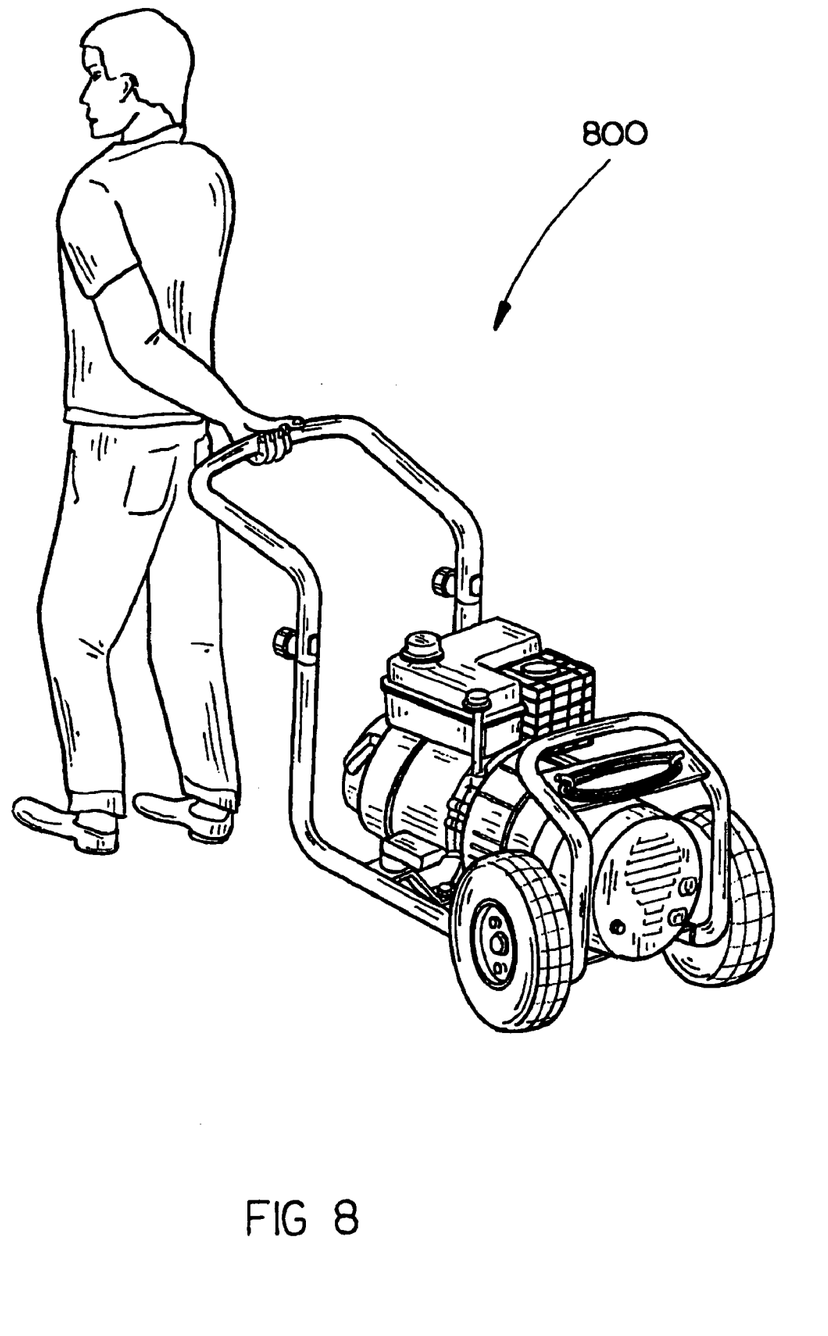
FIG. 8 is an illustration of a user pulling an apparatus including a pair of hooks for securing an extension cord thereto.

Preferably, the radius of the wheels is sized to permit easy rolling transport over obstacles typically found on job-sites, such as tire ruts, scarps of building materials and the like, although wheels of various sizes are contemplated. In the present embodiment the wheels are pneumatic so as to spread out the weight of the apparatus, dampen vibration and the like. In other embodiments, the wheels are formed of plastic to avoid air loss associated with pneumatic tires. Referring to FIG. 8, the apparatus 800 of the present invention allows the user to tilt the frame assembly (with respect to the wheels) to optimize clearance when the apparatus is rolled over terrain. If the mechanical device has an unequal weight distribution it is preferable for a heavier end of the device to be orientated towards the wheels/the intersection of the first and second segments. For example, the alternator end of a generator is disposed adjacent to the wheels to minimize the force necessary to tilt the apparatus for transport, this, is due to the respective weight of the motor/alternator. In a further example, the mechanical device and the first segment extend over the wheels so as to shift the apparatus' center of mass closer to the pivot axis extending through the wheels.

Referring to FIG. 1, in additional exemplary embodiments, vibration dampening devices are employed such as between the device and the base frame member, between the foot member 144 and the first segment of the base frame 110 and the like. Referring to FIG. 3, preferably, the vibration dampening device is an elastomeric pad 346 or disk with a bolt 348 penetrating therethrough. Further, the bolts may be implemented to connect the various components.

It is believed that the apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A portable apparatus, comprising:
    a mechanical device for conducting a task;
    a cart-type frame assembly including:
        a multi-segmented base frame member with a first segment for mounting the mechanical device thereto, a second segment extending from an end of the first segment substantially perpendicular to the first segment, a third segment extending from the second segment at an oblique angle generally towards the first segment and a fourth segment extending substantially perpendicularly from the first segment distal from the second segment;
        a pair of spaced apart wheel members, mounted to the first segment adjacent the intersection of the first and second segments, for rolling transport over a surface;
        a foot member connected to the first frame segment proximal the fourth segment, for supporting the apparatus along with the wheels, when the apparatus is rested on a surface;
        a substantially U-shaped obliquely angled handle frame member removably connected to the fourth segment of the base frame member, for manipulating the apparatus during transport; and
        a securing device for adjustably securing the base frame member to the handle frame member;
    wherein the base frame member forms a partial cage around the mechanical device for preventing damage.

2. The apparatus of claim 1, wherein the base frame member and the handle frame member are formed of tubing.

3. The apparatus of claim 1, wherein the mechanical device is at least one of a compressor, a pressure washer, a pump and a generator.

4. The apparatus of claim 1, wherein the mechanical device is a generator including an alternator disposed substantially adjacent the wheels, for converting mechanical energy to electrical energy.

5. The apparatus of claim 1, further comprising at least one of a vibration dampening device mounted between at least one of the mechanical device and the base frame member and between the base frame member and the foot member.

6. The apparatus of claim 5, wherein the vibration dampening device is an elastomeric pad.

7. The apparatus of claim 1, wherein at least one of the fourth segment and the handle frame member includes a generally C-shaped cross-sectional end for securing to a generally circular shaped cross sectional end of the corresponding frame member.

8. The apparatus of claim 1, wherein the securing device is at least one of a threaded bolt and threaded knob, or a spring biased pin.

9. The apparatus of claim 1, wherein the fourth segment is substantially equal to or greater than the height of the mechanical device.

10. The apparatus of claim 1, wherein the wheels are pneumatic-type wheels.

11. The apparatus of claim 1, further comprising a generally rectangular face plate connected to the third segment for increasing rigidity.

12. The apparatus of claim 11, further comprising means for securing an accessory mounted to the face plate.

13. A cart frame generator apparatus, comprising:
    an internal combustion engine for generating mechanical energy, a fuel reservoir with a filling port therein, mounted to the engine, for supplying the engine with fuel;
an alternator coupled to the engine for converting mechanical energy into electrical energy;
a cart-type frame assembly including;
　a multi-segmented base frame member with a first segment for mounting the mechanical device thereto, a second segment extending from an end of the first segment substantially perpendicular to the first segment, a third segment extending from the second segment at an oblique angle generally towards the first segment and a fourth segment extending substantially perpendicularly from the first segment distal from the second segment;
　a pair of spaced apart wheel members, mounted to the first segment, adjacent the intersection of the first and second segments, for rolling transport over a surface;
　a foot member connected to the first frame segment proximal the fourth segment, for supporting the apparatus along with the wheels, when the apparatus is rested on a surface;
　a substantially U-shaped obliquely angled handle frame member removably connected to the fourth segment of the base frame member, for manipulating the apparatus during transport; and
　means for adjustably securing the base frame member to the handle frame member;
　wherein the third segment extends at least one of substantially equal to the fuel reservoir or greater than the height of the fuel reservoir for protecting the reservoir.

14. The apparatus of claim 13, wherein the base frame member and the handle frame member are formed of tubing.

15. The apparatus of claim 13, wherein the alternator is disposed substantially adjacent the wheels.

16. The apparatus of claim 13, further comprising at least one of a vibration dampening device mounted between at least one of the internal combustion engine and the base frame member or between the base frame member and the foot member.

17. The apparatus of claim 16, wherein the vibration dampening device is an elastomeric pad.

18. The apparatus of claim 13, wherein at least one of the fourth segment and the handle frame member includes a generally C-shaped cross-sectional end for securing to a generally circular shaped cross sectional end of the corresponding frame member.

19. The apparatus of claim 13, wherein the securing means is at least one of a threaded bolt and threaded knob, or a spring biased pin.

20. The apparatus of claim 13, wherein the wheels are pneumatic-type wheels.

21. The apparatus of claim 13, further comprising a generally rectangular face plate connected to the third segment for increasing rigidity.

22. The apparatus of claim 21, further comprising means for securing an accessory mounted to the face plate.

23. A cart frame generator apparatus, comprising:
an internal combustion engine for generating mechanical energy;
an alternator coupled to the engine for converting mechanical energy into electrical energy;
a cart-type frame assembly including:
　a multi-segmented base frame member with a first segment for mounting the mechanical device thereto, a second segment extending from an end of the first segment substantially perpendicular to the first segment, a third segment extending from the second segment at an oblique angle generally towards the first segment and a fourth segment extending substantially perpendicularly from the first segment distal from the second segment;
　a generator bracket connected to the first segment, for supporting the alternator;
　a pair of spaced apart wheel members, mounted to the generator bracket, adjacent the intersection of the first and second segments, for rolling transport over a surface;
　a foot member connected to the first frame segment proximal the fourth segment, for supporting the apparatus along with the wheels, when the apparatus is rested on a surface;
　a substantially U-shaped obliquely angled handle frame member removably connected to the fourth segment of the base frame member, for manipulating the apparatus during transport; and
　means for adjustably securing the base frame member to the handle frame member;
　wherein the third segment extends at least one of substantially equal to the engine or greater than the height of the engine for protecting the generator.

\* \* \* \* \*